United States Patent [19]

Allen

[11] Patent Number: 5,056,259
[45] Date of Patent: Oct. 15, 1991

[54] SOLAR GREENHOUSE FOR GROWING PLANTS

[76] Inventor: William M. Allen, 204 Cayuga Rd., Louisville, Ky. 40207

[21] Appl. No.: 329,378

[22] Filed: Mar. 27, 1989

[51] Int. Cl.$^5$ ............................................. A01G 9/18
[52] U.S. Cl. ...................................................... 47/17
[58] Field of Search ...................... 47/17, 26, 28.1, 31, 47/40, 30, 29; 135/DIG. 902, 900, 901, 87; 220/529, 4.01; 446/128, 124

[56] References Cited

U.S. PATENT DOCUMENTS

| | | | |
|---|---|---|---|
| 1,152,899 | 9/1915 | Moore | 47/40 |
| 2,208,458 | 3/1940 | Julian et al. | 135/87 |
| 2,981,256 | 4/1961 | Besnah | 135/87 |
| 4,099,344 | 7/1978 | Ruemeli | 47/26 |
| 4,116,510 | 9/1978 | Franco | 220/4.01 |
| 4,242,833 | 1/1981 | Maes, Jr. | 47/17 |
| 4,671,011 | 6/1987 | Jantzen | 47/31 |

Primary Examiner—David A. Scherbel
Assistant Examiner—Michele A. Van Patten
Attorney, Agent, or Firm—Jon C. Winger

[57] ABSTRACT

A solar greenhouse includes a peripheral wall structure defining a partially enclosed area having an open side through which plants can be placed inside for admitting light into the greenhouse, and a roof over the wall structure. The roof is removable from over the peripheral wall structure to provide for the easy installation, removal, or rearranging the plants. The inside surfaces of the wall structure and roof are light reflecting to reflect light entering the greenhouse through the open side toward the plants inside the greenhouse. The greenhouse also includes a floor which is a separate component from the peripheral wall structure. The exposed surface of the floor can also be light reflecting. The inclination of the roof relative to the horizontal can be changed to adjust the angle of light reflection of the roof. The solar greenhouse can also include a reticulated panel positionable over the open side of the greenhouse to partially screen light entering the greenhouse as may be needed from time to time without having to reposition or otherwise remove the greenhouse from its location.

15 Claims, 4 Drawing Sheets

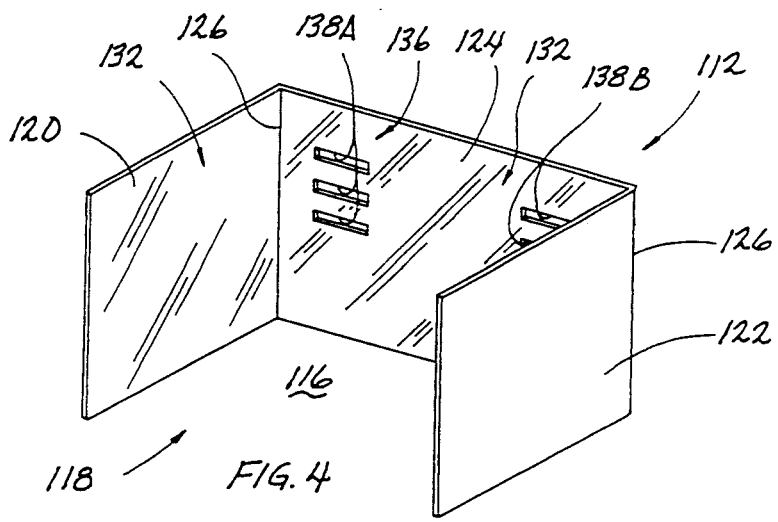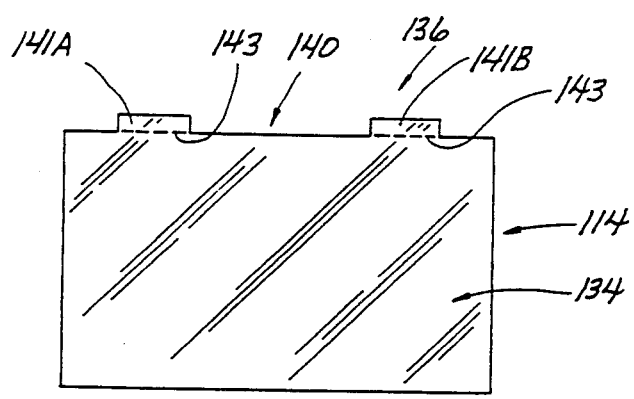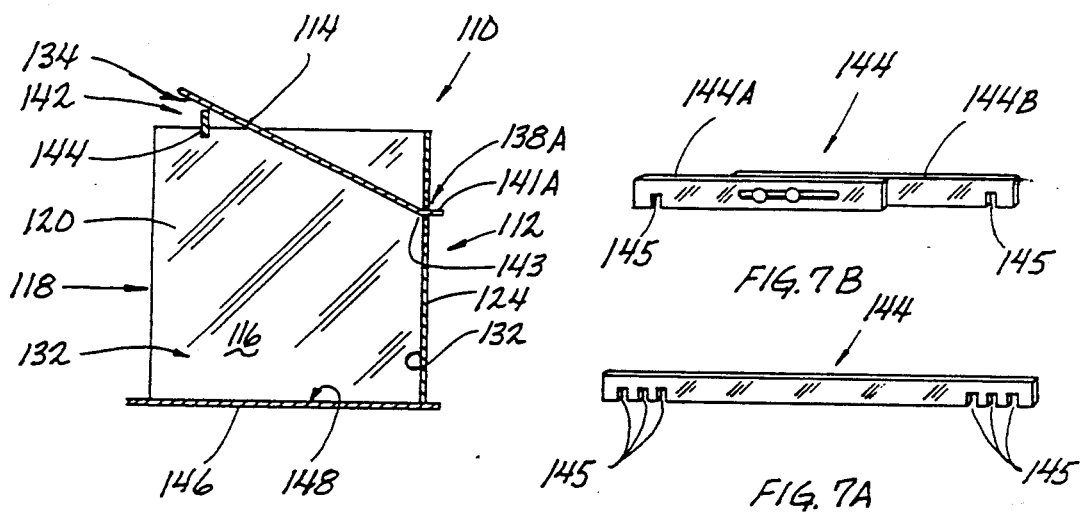

SOLAR GREENHOUSE FOR GROWING PLANTS

BACKGROUND OF THE INVENTION

The present invention relates to solar greenhouses in which plants can be grown indoors, and more particularly to a solar greenhouse constructed to readily adjust for the amount of light available and constructed to readily adjust for the size of the plants as they grow.

Solar greenhouses are, per se, known. The following U.S. Patents show various solar enclosures for growing plants: U.S. Pat. No. 4,023,306 issued to Nicola Roggieri on May 17, 1977; U.S. Pat. No. 2,777,253 issued to B. M. Benson on Jan. 15, 1957; and U.S. Pat. No. 1,575,683 issued to R. E. Groves on Mar. 9, 1926.

SUMMARY OF THE INVENTION

The solar greenhouse of my invention satisfies many objectives not even addressed by solar greenhouses known to me.

One objective of the present invention is to provide a solar greenhouse having an open side and a roof with an interior light reflecting surface wherein the inclination of the roof can be adjusted to compensate for the amount of light available and the angle of incidence of the light relative to the open side.

Another objective of the present invention is to provide a solar greenhouse having an open side and side walls with interior reflecting surfaces wherein the angle of the side walls relative to the open side of the solar greenhouse can be adjusted to compensate for the amount of light and angle of incidence of the light relative to the open side.

A further objective of the present invention is to provide a solar greenhouse having a roof wherein the roof is movable to compensate for the size of the plants therein as the plants grow.

An even further objective of the present invention is to provide a solar greenhouse having a removable screen positionable over the open side of the greenhouse to partially screen out excess light as may be needed.

More particularly, the present invention provides, in one embodiment, a solar greenhouse for growing plants indoors which comprises a wall structure defining a partially enclosed area open at one side, the interior surface of the wall structure being light reflecting, a roof disposed over the wall structure, the interior surface of the roof being light reflective, and means for selectively changing the inclination of the roof relative to the horizontal.

BRIEF DESCRIPTION OF THE DRAWINGS

The various objectives and features of the present invention will become even more clear upon reference to the following description in conjunction with the accompanying drawings in which like numerals refer to like parts throughout the several views and wherein:

FIG. 4 is a perspective view of another embodiment of a wall structure of the solar greenhouse of the present invention;

FIG. 5 is a plan view, showing the interior side of another embodiment of a roof of the solar greenhouse of the present invention;

FIG. 6 is a cross-section side view of another embodiment of a solar greenhouse of the present invention including the components of FIGS. 4 and 5;

FIG. 7A and 7B are perspective views of alternative embodiments of a component of the solar greenhouse of FIG. 6;

DETAILED DESCRIPTION OF THE PREFERRED EMBODIMENTS

Figure 1:
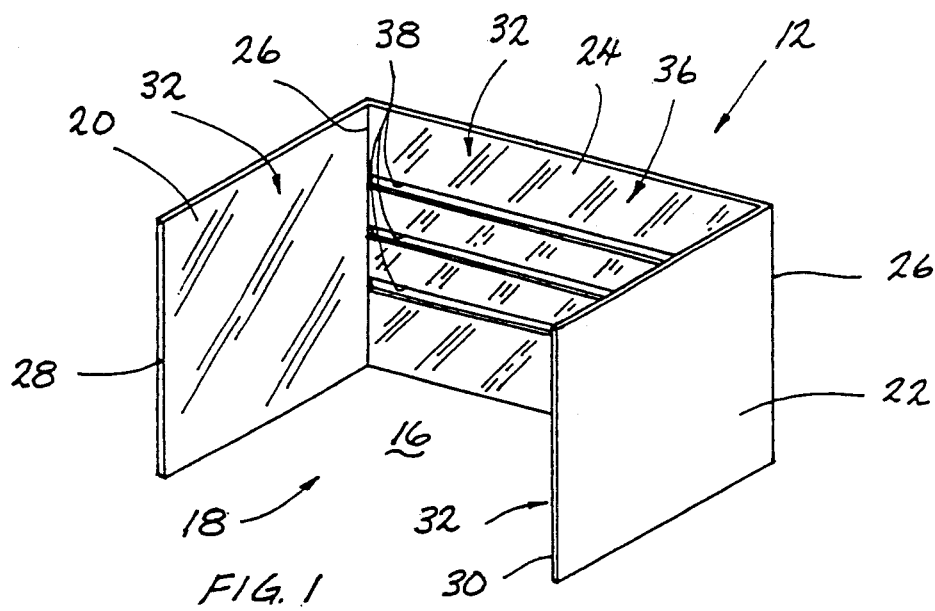
FIG. 1 is a perspective view of a wall structure of the solar greenhouse of the present invention.
Figure 2:
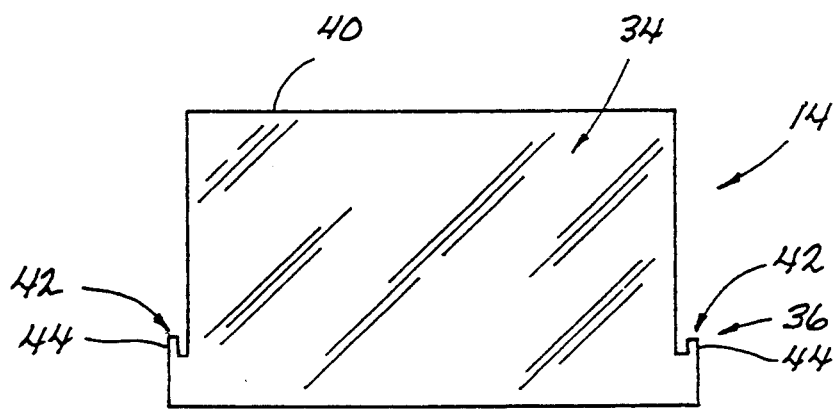
FIG. 2 is a plan view showing the interior side of a roof of the solar greenhouses of the present invention.
Figure 3:
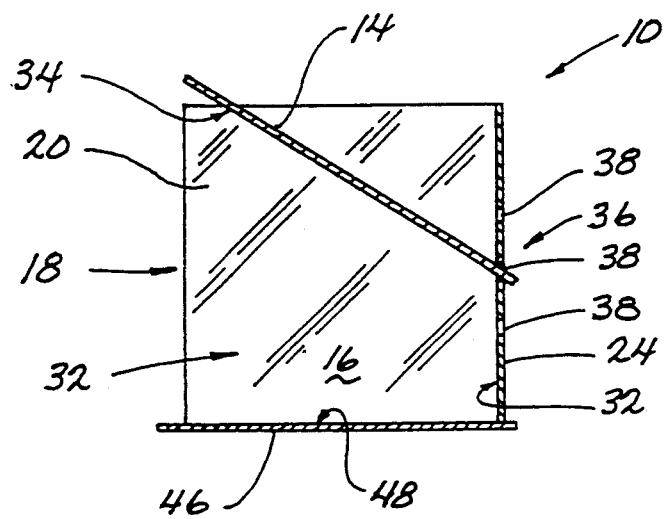
FIG. 3 is a side view of one embodiment of a solar greenhouse of the present invention including the components of FIGS. 1 and 2.

With reference to FIGS. 1 through 3, there is shown a solar greenhouse of the present invention, generally denoted as the numeral 10. The greenhouse 10 includes a wall structure, generally denoted as the numeral 12, and a roof 14 disposed over the wall structure 12.

With reference to FIG. 1 and continued reference to FIG. 3, the wall structure 12 defines a partially enclosed interior area 16 with an open front side 18 into the interior area. The wall structure 12 could be arcuate in the manner of a horse shoe, or, preferably and as shown, the wall structure 12 includes two side walls 20, 22 and a back wall 24. Hinge means 26 interconnect the opposite ends of the back wall 24 to the adjacent proximal ends of the side walls 20, 22. The open front side 18 into the solar greenhouse 10 is defined between the distal ends 28 and 30 of the side walls 20 and 22, respectively, so that the side walls 20 and 22 can be pivoted relative to the back wall 24 about the hinge means 26 to change the included angle between the side walls 20, 22 and back wall 24. By changing the angles of the side walls 20, 22, their angle relative to the open front side 18 of the solar greenhouse 10 is also changed to compensate for different angles of incidence of light directed into the solar greenhouse 10 through the open front side 18. As shown, the side walls 20, 22 and back wall 24 can be fabricated of a single sheet of material, for example, heavy paper, corrugated paper, cardboard, or plastic, and the hinge means 26 is a fold line or living hinge. The interior surfaces 32 of the wall structure 12 are light reflecting. These interior surfaces 32 can be made light reflecting in various ways. For example, if the wall structure 12 is made of paper or cardboard, the interior wall surfaces can be laminated with a layer of light reflecting material such as, for example, aluminum foil or sprayed with a light-reflecting material or the like.

The roof 14 is disposed over the top of the wall structure 12 to close the open top thereof. Preferably, the interior surface 34 of the roof 14 is light reflecting. If the roof 14 is fabricated of, for example, heavy paper, corrugated paper, cardboard, or plastic, it can be laminated with a light reflecting material such as, for example, aluminum foil or the like. The roof 14 is disposed at an incline from the back wall 24 of the wall structure 12 toward the open front side 18 of the wall structure 12. As shown best in FIG. 3, the roof 14 is joined at its back edge to the back wall 24 of the wall structure 12 and is supported on the side walls 20, 22 of the wall structure 12 in the inclined position.

With continued reference to FIGS. 1–3, the solar greenhouse 10 further includes means, generally denoted as the numeral 36, for changing the inclination of the roof 14 relative to the horizontal. As shown, the inclination changing means 36 comprises a plurality of slots 38 formed in the back wall 24 of the wall structure 12 opposite the open side 18 thereof. The slots 38 are generally parallel, horizontal, and are spaced apart from each other so each one is at a different elevation along the height of the back wall 24. The back edge 40 of the roof 14 is constructed to be removably received in any one of the slots 38 for holding the back edge 40 of the roof 14 at the position of the slot 38 in which it is received.

The roof 14 is held at selected angles of inclination by coacting means, generally denoted as the numeral 42, which coact with the roof 14 and side walls 20, 22 of the wall structure 12 to hold the roof at a selected inclination. As shown, the coacting means 42 comprise means 44 associated with the roof 14 for receiving the top edges of the side walls 20, 22 of the wall structure 12. Means 44 is illustrated as recesses formed in the lateral sides of the roof 14 for receiving the top edges of the side walls 20, 22. Thusly, in order to change the inclination of the roof 14, the back edge 40 of the roof 14 is inserted a greater distance into a particular one of the slots 38 or into a different one of the slots 38 in the back wall 24 of the wall structure 12. For example, to change the roof incline to a steeper angle, the back edge 40 of the roof 14 is inserted into a lower one of the slots 38, and to change the roof incline to a shallower angle, the back edge 40 of the roof 14 is inserted into a higher one of the slots 38. Alternatively, with the back edge 40 of the roof 14 in a given one of the slots 38, the inclination of the roof 14 can be increased by inserting the rear edge 40 further into the slot 38 and to change the incline to a shallower incline, the rear edge 40 is pulled further outwardly of the slot 38. The recesses 44 receiving the top edges of the side walls 20, 22 support the roof 14 at the top edge of the side walls 20, 22 regardless of which one of the slots 38 is used to support the back edge 40 of the roof 14. Thusly, the incline of the roof 14 can be selectively changed to compensate for the angle of incidence of the sunlight at different times of the day. It should also be noted that the slots 38 also provide for changing the height or elevation of the roof 14 along the elevation of the back wall 24 as the plants in the solar greenhouse 10 grow.

With reference to FIG. 3, the solar greenhouse 10 can also include a floor 46. The floor 46 can be attached to the wall structure 12, but, as shown, is preferably a separate component not affixed or attached to the wall structure 12. The floor 46 is planar, and can be fabricated of the same material as the wall structure 12, and roof 14. The interior surface 48 of the floor 46 can be light reflecting. Also, as shown, the area of the floor 46 is larger than the area 16 defined by the wall structure 12 so that bottom edges of the wall structure 12 rests on the floor 46. Thusly, the wall structure 12 can be lifted from the floor 14 without disturbing any of the plants within the greenhouse 10. This feature allows the removal of selected plants from the greenhouse without disturbing the other plants and for ease in rearranging the positions of the plants.

Now with reference to FIGS. 4–7, there is shown another embodiment of a solar greenhouse, generally denoted as the numeral 110, which is similar to the solar greenhouse 10, and therefore, similar features are denoted by similar numerals. The solar greenhouse 110 includes a wall structure 112, and a roof 114 disposed over the wall structure.

The wall structure 112 defines a partially enclosed area 116 with an open front side 118 into the interior area. As shown, the wall structure 112 includes two side walls 120, 122 and a back wall 124 interconnecting the side walls 120, 122. Hinge means 126 interconnect the opposite ends of the back wall 124 to the adjacent proximal ends of the side walls 120, 122. As with the wall structure 12, the interior surfaces 132 of the wall structure 112 are light reflecting.

The roof 114 is disposed over the wall structure 112 to close the open top thereof. The interior surface 134 of the roof 114 is also light reflecting. The roof 114 is joined at its back edge 140 to the back wall 124 of the wall structure 112 and is supported on the side walls 120, 122 of the wall structure 112 in the inclined position.

The solar greenhouse 110 also includes means, generally denoted as the numeral 136, for changing the inclination of the roof relative to the horizontal. As shown, the inclination changing means comprises a plurality of pairs 138 of slots 138A and 138B formed in the back wall 124. Each slot 138A, 138B of a pair 138 are in longitudinal alignment, and the pairs 138 of slots 138A, 138B are generally parallel, horizontal, and are spaced apart from each other so that each pair 138 of slots 138A and 138B is at a different elevation along the height of the back wall 124. The back edge 140 of the roof 114 is constructed with a pair 141 outwardly projecting tabs 141A, 141B which are removably received in the two slots 138A, 138B of any one of the pair 138 of slots 138A, 138B for holding the back edge of the roof 114 at the position of the slots 138A, 138B in which the tabs 141A, 141B are received. The roof 114 further includes hinge means 143 adjacent the back edge 140 about which the roof 114 can pivot to a selected inclination. As shown, the hinge means 143 is a fold line at the juncture of the tabs 141A, 141B and back edge 140 of the roof 114. With reference to FIG. 7, the roof 114 is held at selected angles of inclination by coacting means, generally denoted as the numeral 142, which coacts with the roof 114 and the side walls 120, 122 of the wall structure to hold the roof at a selected inclination. As shown in FIGS. 7A and 7B, the coacting means 142 comprises a bar 144 which spans the width of the area 116 enclosed by wall structure 112 between the side walls 120, 122. The bar 144 includes a plurality of notches 145 in one edge for receiving the top edges of the side walls 120, 122. The notches 145 allow the bar 144 to be located anywhere along the length of the side walls 120, 122 by merely sliding the bar 144 with the notches 145 receiving the top edges of the walls 120, 122 along the walls 120, 122. The interior surface 134 of the roof 114 is in contact with the top side of the bar 144 and, therefore, coacts with the bar 144 holding the roof 114 in position. With reference to FIG. 7A, the bar 144 is of unitary construction and includes a plurality of pairs of notches 145. Thus, as the wall structure side walls 120, 122 may be pivoted about the hinges 126 changing the distance between the side walls 120, 122, the top edges of the side walls 120, 122 are received in different pairs of notches 145. With reference to FIG. 7B, the bar 144 comprises bar sections 144A and 144B which are telescopically attached together providing for the selective adjustment of the length of the bar 144. Thus, as the wall structure side walls 120, 122 may be pivoted about the hinges 126 interconnecting them to the back wall 124, the length of the bar 144 can be adjusted to suit the distance between the side walls 120, 122. The exterior surface of the bar 144 can also be light reflecting.

The inclination of the roof 114 can be selectively changed in a number of ways. First, with the back edge 140 of the roof 114 held in a particular location by the tabs 141 received in a particular set of slots 138, the inclination of the roof 114 can be changed by moving the bar 144 to a different location along the top edges of the side walls. Second, the inclination of the roof 114 can also be selectively changed by leaving the bar 144 at a particular location along the top edges of the side walls, and changing the position of the back edge 140 of the roof 114 at the back wall 124 of the wall structure 112 by moving the tabs 141 to a different pair 138 of slots 138A and 138B. Third, the inclination of the roof 114 can be changed by both changing the location of the bar along the length of the side walls and also changing the position of the back edge 140 of the roof 114 at the back wall 124 of the wall structure 112. It should be noted that by changing the location of the back edge 140 of the roof 114 at the back wall 124 of the wall structure 112, the height or elevation of the roof 114 is also changed.

Figure 8:
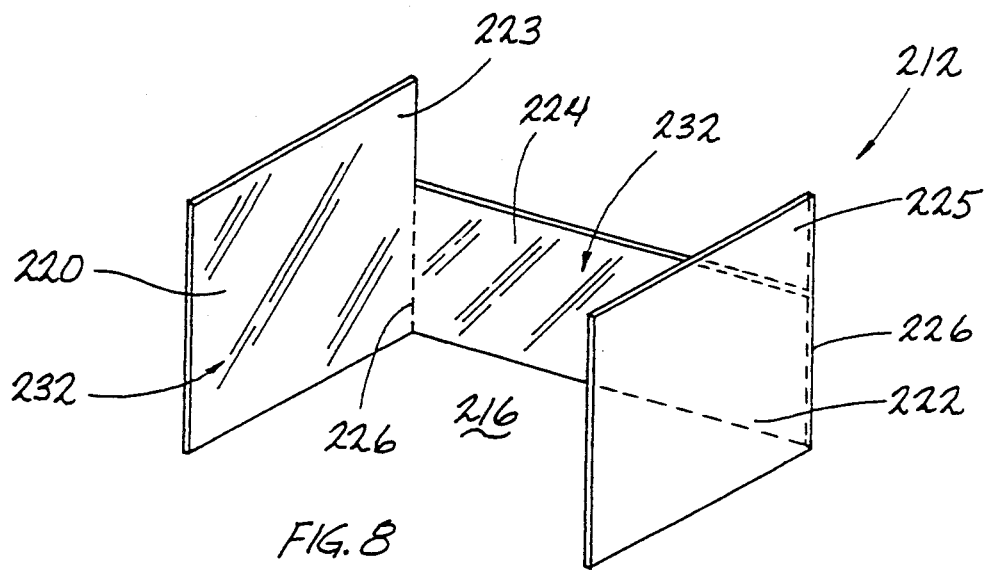
FIG. 8 is a perspective view of yet another embodiment of a wall structure of the solar greenhouse of the present invention.
Figure 9:
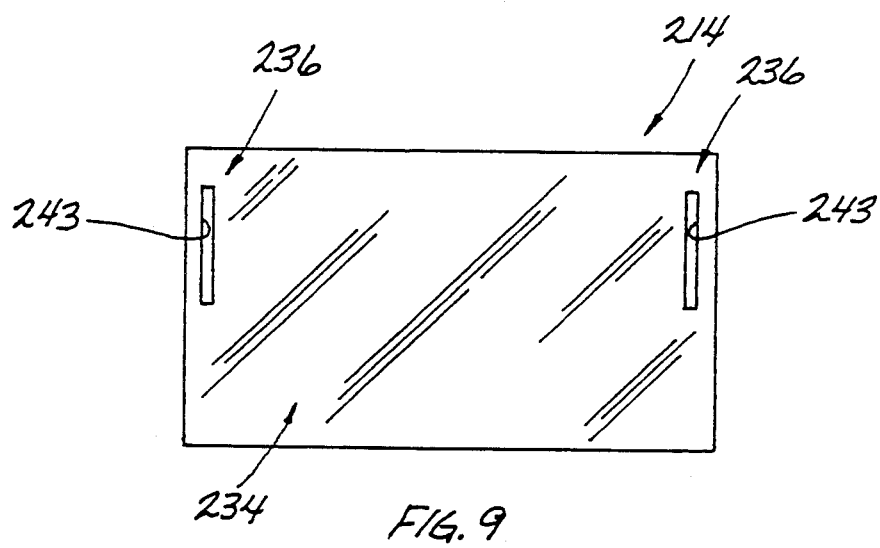
FIG. 9 is a plan view, showing the interior side of another embodiment of a roof of the solar greenhouse of the present invention.
Figure 10:
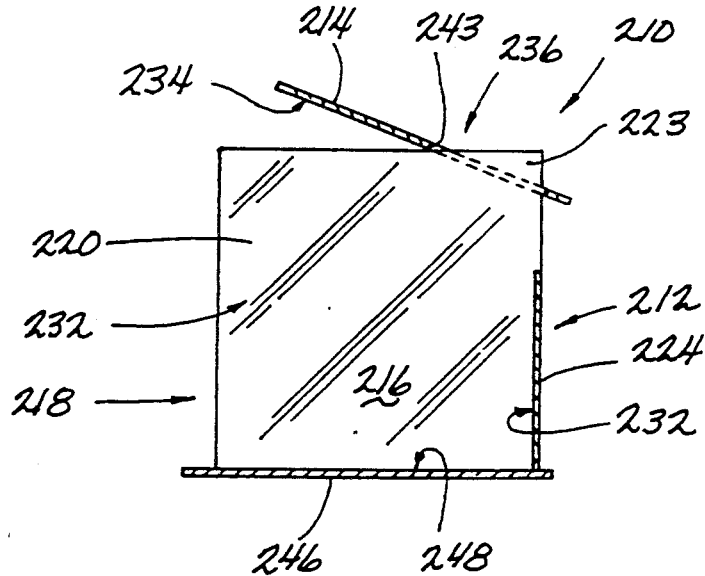
FIG. 10 is a cross-sectional side view of yet another embodiment of a greenhouse of the present invention including the components of FIGS. 8 and 9.

Now with reference to FIGS. 8, 9 and 10, there is shown yet a further embodiment of a solar greenhouse, generally denoted as the numeral 210, which is similar to the solar greenhouse 10, 110 and, therefore, similar features are denoted by similar numerals. The greenhouse 210 includes a wall structure 212 and a roof 214 disposed over the wall structure 212.

The wall structure 212 defines a partially enclosed area 216 with an open front side 218 into the interior area. As shown, the wall structure 212 includes two side walls 220, 222 and a back wall 224 interconnecting the side walls. Hinge means 226 interconnect the opposite ends of the back wall 224 to the adjacent proximal ends of the side walls 220, 222. The interior surfaces 232 of the wall structure are light reflecting.

The roof 214 is removably disposed over the wall structure 212 to close the open top thereof. The interior surface 234 of the roof 214 is also light reflecting. The roof 214 is removably mounted to the wall structure side walls 220, 222 and is also mounted to the side walls so that the inclination of the roof 214 can be selectively changed. Toward this objective, the back wall 224 of the wall structure 212 is shorter in elevation than the side walls 220, 222 so that each of the side walls 220, 222 form a corner 223, 225 at its proximal end adjacent the interface thereof with the back wall 224 above the elevation of the top edge of the back wall 224. The roof 214 includes means 236 for selectively changing the inclination of the roof 214 relative to the horizontal and also for removably attaching the roof 214 to the side walls 220, 222. As shown, the means 236 comprises a pair of parallel slits 243 formed through the roof 214 at opposite lateral sides thereof. The distance between the slits 243 is somewhat greater than the distance between the corners 223, 225 of the side walls 220, 222. Alternatively, the width of the slits 243 can be somewhat smaller than the thickness of the side walls 220, 222. Each slit 243 receives a different one of the corners 223, 225, respectively, with a friction fit so that the roof 214 is supported by the side walls 220, 222 and the inclination of the roof 214 can be easily changed.

Figure 11:
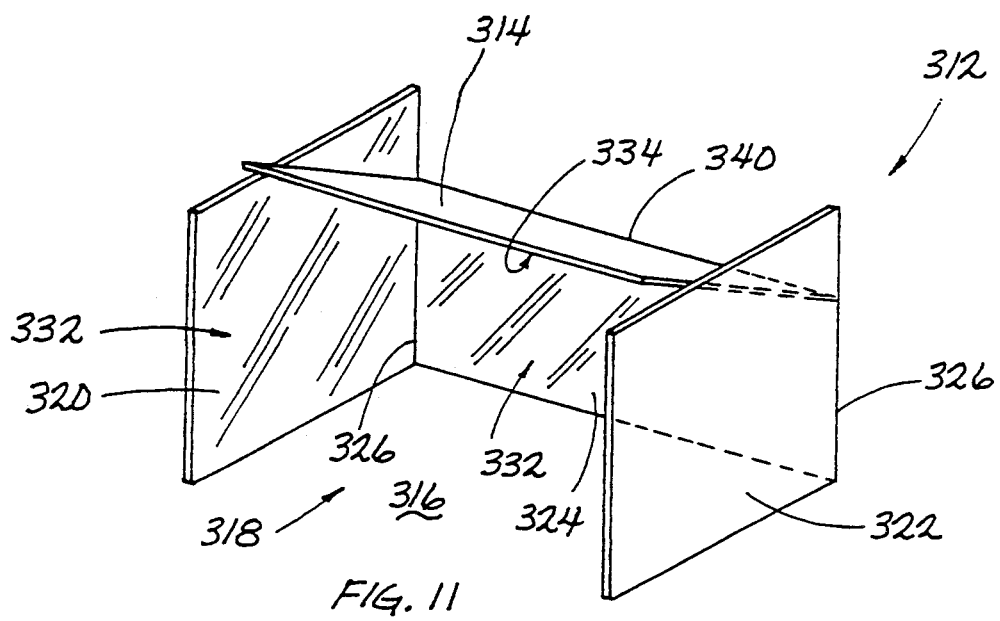
FIG. 11 is a perspective view of still another embodiment of a solar greenhouse of the present invention.
Figure 12:
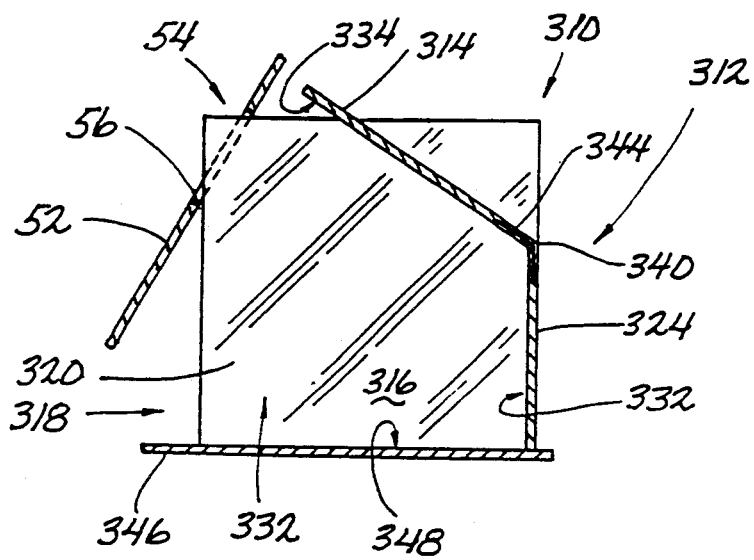
FIG. 12 is a cross-sectional side view of the solar greenhouse of FIG. 11.

Now with reference to FIGS. 11 and 12, there is shown a greenhouse, generally denoted by the numeral 310 which has many features in common with the greenhouses 10, 110, 210, and similar features are denoted by similar numerals. As can be best seen in FIGS. 11 and 12, the greenhouse 310 includes a wall structure 312 and a roof 314 disposed over the wall structure 312.

The wall structure 312 includes two side walls 320, 322 and a back wall 324 interconnecting the side walls. Hinge means 326 interconnect the opposite ends of the back wall 324 to the adjacent proximal ends of the side walls 320, 322.

The roof 314 is movably disposed over the wall structure 312 to close the open top thereof. The back wall 324 of the wall structure 312 is shorter in elevation than the side walls 320, 322 and the back edge 340 of the roof 314 is pivotally attached to the top edge of the back wall 324. The width of the roof 314 is somewhat smaller than the distance between the side walls 320, 322. Thusly, the inclination of the roof 314 moves about the pivotal attachment of its back edge 340 to the top edge of the back wall 324. For example, if the wall structure 312 and roof 314 are fabricated of paperboard or cardboard, the roof 314 can be unitary with the back wall 324 and the pivotal attachment is a fold line. In this case, the roof 314 could be held at any desired angle of inclination by, for example, including wires 344 in the back wall 324 and roof 314 extending from the back wall 324 to the roof 314.

As shown in FIG. 12, the floor 346 extends a substantial distance in front of the front opening 318 of the greenhouse 310. In this embodiment, the reflective surface 348 of the portion of the floor 346 extending beyond the front opening 318 also reflects sunlight into the interior space 316 of the greenhouse 310.

Figure 13:
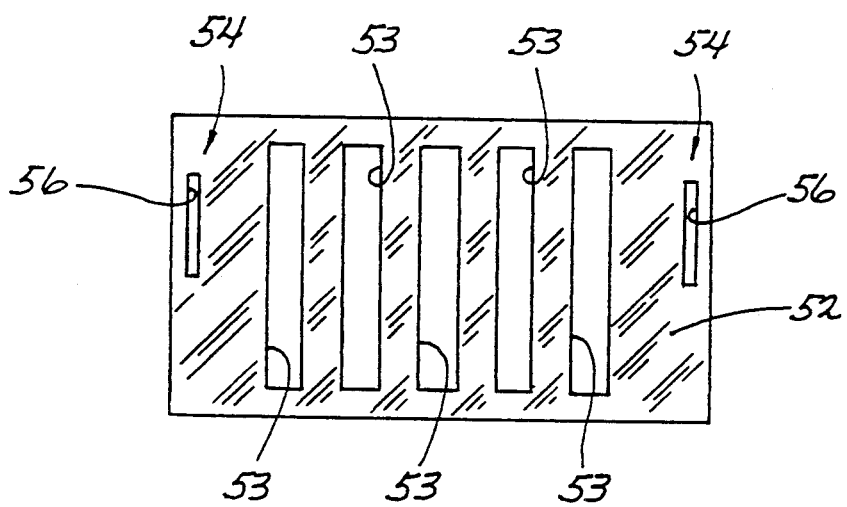
FIG. 13 is a plan view of still another component of the present invention usable with any of the greenhouses of FIGS. 3, 6, 10 or 12.

Now with reference to FIGS. 12 and 13, there is shown means, generally denoted as the numeral 52, for screening light entering the open side of the wall structure. It should be clearly understood that while the light screening means 52 is shown in FIG. 12 in use with the greenhouse 310, it is also used with the greenhouses 10, 110 and 210 as well. The screening means 52 is shown as a reticulated panel having openings 53 for the passage therethrough of sunlight. The reticulated panel is positioned across the open side of the wall structure as may be needed to prevent at least a portion of the ambient light from entering the enclosed area providing for the modulation of the ambient light into enclosed area. The reticulated screening panel 52 includes means 54 for selectively changing the inclination of the panel 52 relative to the vertical over the open side of the wall structure and also for attaching the panel 52 to the wall structure. As shown, the means 54 comprises a pair of parallel slits 56 formed through the reticulated panel 52 at opposite lateral sides thereof. The width of the slits 56 is somewhat smaller than the thickness of the side walls to provide a friction fit between the walls of the slits 156 and the side walls, or spaced further apart than the side walls 320, 322. Each slit 56 receives the corner at the distal or free end of a different one of the side walls at the intersection of the top edge and distal end of the side wall with a friction fit so that the panel 52 is supported by the side walls across the open side therebetween and so that the inclination of the panel 52 can be changed to compensate for different angles of incidence of the ambient light as it changes during different times of the day. The screen may also be placed flat over the top of the wall structure supported on the top edges of the side walls or be placed across the open front of the wall structure and lean against the distal ends of the side walls.

Thus, it can be readily appreciated that the solar greenhouse of the present invention is extremely versatile in that it can be adjusted in a number of ways to compensate not only for changing angles of incidence of the solar light, but also can be adjusted for plants of various heights as well as for the plants inside as they progressively grow.

It can be also appreciated that when the greenhouse is disassembled, the wall structure folds into a flat stack, and can be stacked with the roof and screen to form a compact flat package which takes up little room for storage.

The foregoing detailed description is given primarily for clearness of understanding and no unnecessary limitations are to be understood therefrom for modifications will become obvious to those skilled in the art and may be made without departing from the spirit of the invention and scope of the appended claims.

I claim:

1. A solar greenhouse for growing plants indoors comprises:
    a wall structure defining a partially enclosed area open at one side, the interior surface of the wall structure being light reflective;
    a roof disposed over the wall structure, the interior of the roof being light reflective;
    means for attaching the roof to the wall structure opposite the open side of the wall structure at different selected elevations on the wall structure; and,
    means for coacting with the roof and wall structure above the elevation of the attaching means attaching the roof to the wall structure for supporting the roof at different selected inclinations.

2. The solar greenhouse of claim 1, wherein the attaching means for attaching the roof to the wall structure comprises a plurality of slots formed in the wall structure opposite the open side thereof, the slots being spaced apart from each other at different elevations, and the back edge of the roof being constructed to be removably received in selected slots for holding the back edge of the roof in position in a selected slot at a selected elevation on the wall structure opposite the open side.

3. The solar greenhouse of claim 2, wherein the means for attaching the roof to the wall structure comprises the roof having a hinge adjacent the back edge of the roof receivable in the slots about which the roof can be pivoted when the back edge is received in a slot to a selected inclination.

4. The solar greenhouse of claim 2, wherein the construction of the back edge of the roof receivable in the slots comprises at least one outwardly projecting tab receivable in the slot.

5. The solar greenhouse of claim 1, wherein the housing structure comprises two side walls and the means for selectively changing the inclination of the roof relative to the horizontal comprises means coacting with the roof and side walls of the wall structure at the top edge of the side walls of the wall structure.

6. The solar greenhouse of claim 5, wherein the coacting means comprises means associated with the roof for receiving the top edge of the side walls of the wall structure.

7. The solar greenhouse of claim 5, wherein the coacting means comprises a bar spanning the width of the area enclosed by the wall structure between the side walls and supported on the side walls of the wall structure, and the interior surface of the roof being in contact with the bar.

8. The solar greenhouse of claim 7, wherein the bar comprises sections which are telescopically attached together providing for the selective adjustment of the length of the bar member.

9. The solar greenhouse of claim 7, wherein the surface of the bar is light reflecting.

10. The solar greenhouse of claim 2, wherein the wall structure comprises:
    two side walls;
    a back wall opposite the open side of the wall structure; and
    hinge means interconnecting the back wall to both side walls about which the side walls can be pivoted to selectively change the included angle between the side walls and back wall.

11. The solar greenhouse of claim 2, further comprising a floor having a light reflecting interior surface.

12. The solar greenhouse of claim 1 further comprising a reticulated panel disposed across the open side of the wall structure for screening light entering the open side of the wall structure.

13. The solar greenhouse of claim 12, further comprising means for selectively changing the inclination of the reticulated panel relative to the vertical.

14. The solar greenhouse of claim 13, wherein the means for changing the inclination of the reticulated panel further comprises means for attaching the reticulated panel to the wall structure.

15. A solar greenhouse for growing plants indoors comprises:
    a wall structure comprising two side walls and a back wall interconnecting the side walls, the interior surfaces of the wall structure being light reflective;
    a roof disposed over the wall structure, the interior surface of the roof being light reflective; and
    means defining slits in the roof for receiving portions of the side walls of the wall structure for attaching the roof to the wall structure and for also providing for the change in inclination of the roof relative to the horizontal.

* * * * *